United States Patent [19]

Josowicz et al.

[11] Patent Number: 5,569,736
[45] Date of Patent: Oct. 29, 1996

[54] INORGANIC-ORGANIC COMPOSITE POLYMERS AND METHODS OF MAKING

[75] Inventors: Mira A. Josowicz; Gregory J. Exarhos, both of Richland, Wash.

[73] Assignee: Battelle Memorial Institute, Richland, Wash.

[21] Appl. No.: 344,786

[22] Filed: Nov. 22, 1994

[51] Int. Cl.$^6$ .............................. C08G 4/00; C08G 16/00; C25B 1/00; C25B 3/00
[52] U.S. Cl. .......................... 528/223; 528/224; 528/399; 205/414
[58] Field of Search .............................. 204/59 R, 59 F, 204/59 M, 59 QM; 528/223, 224, 399

[56] References Cited

U.S. PATENT DOCUMENTS

| | | | |
|---|---|---|---|
| H1,309 | 5/1994 | Allen et al. | 528/399 |
| 3,415,789 | 12/1968 | Coover, Jr. et al. | 260/77.5 |
| 4,749,489 | 6/1988 | Allen et al. | 210/500.28 |

OTHER PUBLICATIONS

Allcock, "Phosphonitrilic Chemistry", C&EN (April 22, 1968), pp. 68–81.

Primary Examiner—Kathryn Gorgos
Assistant Examiner—Edna Wong
Attorney, Agent, or Firm—Paul W. Zimmerman

[57] ABSTRACT

The invention is a composition of an inorganic-organic polymer composite and a method of making it. The inorganic portion of the fundamental polymer composite polymer repeat is a speciated inorganic heterocyclic compound, and the organic portion of the polymer repeat is a cyclic organic radical anion compound having at least two charged sites. The composition of the present invention is made by combining a cyclic organic radical anion compound with a speciated inorganic heterocyclic compound by a nucleophilic substitution thereby forming a polymer of an inorganic-organic composite. The cyclic organic radical anion compound is preferably generated electrochemically. The nucleophilic substitution is alternately carried out chemically or electrochemically. A preferred embodiment of the present invention includes performing the nucleophilic substitution at the cathode of an electrochemical cell.

24 Claims, 2 Drawing Sheets

INORGANIC-ORGANIC COMPOSITE POLYMERS AND METHODS OF MAKING

This invention was made with Government support under Contract DE-AC06-76RLO 1830 awarded by the U.S. Department of Energy. The Government has certain rights in the invention.

FIELD OF THE INVENTION

The present invention relates generally to an inorganic-organic composite polymer and methods for making it. More specifically, the inorganic-organic composite polymer derives from a reactive organic intermediate that is coupled to a speciated inorganic heterocyclic compound. The method of making the inorganic-organic composite polymer is comprised of the steps of generating the reactive organic intermediate from an organic intermediate and reacting it with the speciated inorganic heterocyclic compound by means of a nucleophilic substitution reaction to form a 3-D crosslinked network.

BACKGROUND OF THE INVENTION

Inorganic-organic composite materials are used in prosthetic coatings, battery separator membranes, semiconductor devices and in many other applications. Inorganic-organic composite materials range from mechanically mixed inorganic and organic materials to chemically reacted and bonded inorganic and organic compounds.

Inorganic-organic polymer composite materials have been shown to be possible to polymerize chemically either by melting the precursors (Massaki Yokoyama, Hideao Cho and Kenji Kono, Kogyo Kagaku Zashi 67 (9) 1378–82 (1964)) or by heating a solution containing the precursors (S. M. Zhivukhim, V. V. Kireev and A. N. Zelenetskii, Ah. Prik. Khim. 39 (1) 234–37 (1966) (Russian); (S. M. Zhivukhim, V. V. Kireev, N. V. Aulova and L. T. Gerasimenko. Dokl. Akad. Nauk. SSSR, 158 (4) 896–99 (1964) (Russian). When nitrobenzene was used as a solvent, the thermal polymerization required a temperature of about 200° C. In m-xylene solvents, the chemical polymerization reaction occurred between about 70° and 130° C. The analysis of the insoluble reaction products (powder) provided the information that a high molecular polymer was formed between the $(NPCl_2)_3$ and the oxygen atoms of the arylene precursors.

Synthesis of small-molecule cyclic phosphazenes bearing ortho-substituted aryloxy and phenoxy substituents has also been demonstrated (H. R. Allcock, A. A. Dembeck, M. N. Mang, G. H. Riding, M. Parvez and K. B. Visscher, Inorganic Chemistry, Vol. 3 No. 13 (1992), 2734–39). In the synthesis, the sodium 2-phenylphenoxide was used for the substitution of the chlor atoms by the phenyl groups. The nucleophilic substitution reaction was carried out in dioxane in the presence of tetra-n-butylammoniumbromide at 100° C. By this process the product (powder) is precipitated into the solution, but is impure since it contains reaction byproducts.

Therefore, it is an object of the present invention to make an inorganic-organic polymer composite of a reactive organic intermediate coupled with a speciated inorganic heterocyclic compound.

It is a further object of the present invention to couple a reactive organic intermediate with a speciated inorganic heterocyclic compound via a nucleophilic substitution.

It is a yet further object of the present invention to couple, in situ, a reactive organic intermediate with a speciated inorganic heterocyclic compound via a nucleophilic substitution reaction.

SUMMARY OF THE INVENTION

The invention is a composition of an inorganic-organic polymer composite and a method of making it. The inorganic portion of the fundamental polymer composite polymer repeat is derived from a speciated inorganic heterocyclic compound, and the organic portion of the polymer repeat is derived from a cyclic organic radical anion compound having at least two charged sites.

The composition of the present invention is made with the steps of:

(a) combining a cyclic organic radical anion compound molecule with a speciated inorganic heterocyclic compound molecule by a nucleophilic substitution reaction; and (b) performing at least a second nucleophilic substitution between either the cyclic organic radical anion compound molecule or the speciated inorganic heterocyclic compound molecule with at least a second molecule of either the speciated inorganic heterocyclic compound or the cyclic organic radical anion compound respectively; thereby (c) forming a polymer of an inorganic-organic composite.

Additionally, the cyclic organic radical anion compound may be generated chemically or electrochemically from an organic intermediate, specifically a cyclic organic intermediate. In the present invention it is preferred to generate the cyclic organic radical anion compound electrochemically.

The nucleophilic substitution is alternatively carried out chemically or electrochemically. A preferred embodiment of the present invention includes performing the nucleophilic substitution at the cathode of an electrochemical cell.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Composition

The composition of the present invention is at least two molecules of a first compound bonded to at least one molecule of a second compound wherein the first compound is either a speciated inorganic heterocyclic compound or a cyclic organic radical anion compound, and the second compound is the other of the speciated inorganic heterocyclic compound or the cyclic organic radical anion compound, and the bonding between said first and second compounds is by nucleophilic substitution.

Compounds that are speciated inorganic heterocyclic compounds include but are not limited to a multi-metric ring, and phosphoro compounds. The multi-metric ring includes but is not limited to trimetric, tetrametric, hexametric, octametric and higher metric rings. The multi-metric ring further includes a functional bonding site characterized by, for example —P—X, —B—X, and/or —S—X, or Si—X, Se—X, and/or Ge—X bonds where X is a halogen from group 7a of the periodic table of the elements, or a group, for example an amine. Cyclic phosphazenes are multi-metric rings and include but are not limited to cyclometallophosphazene, chlorophosphazene, phosphoro compounds having, for example sulfur, selenium, and/or boron.

Figure 1:
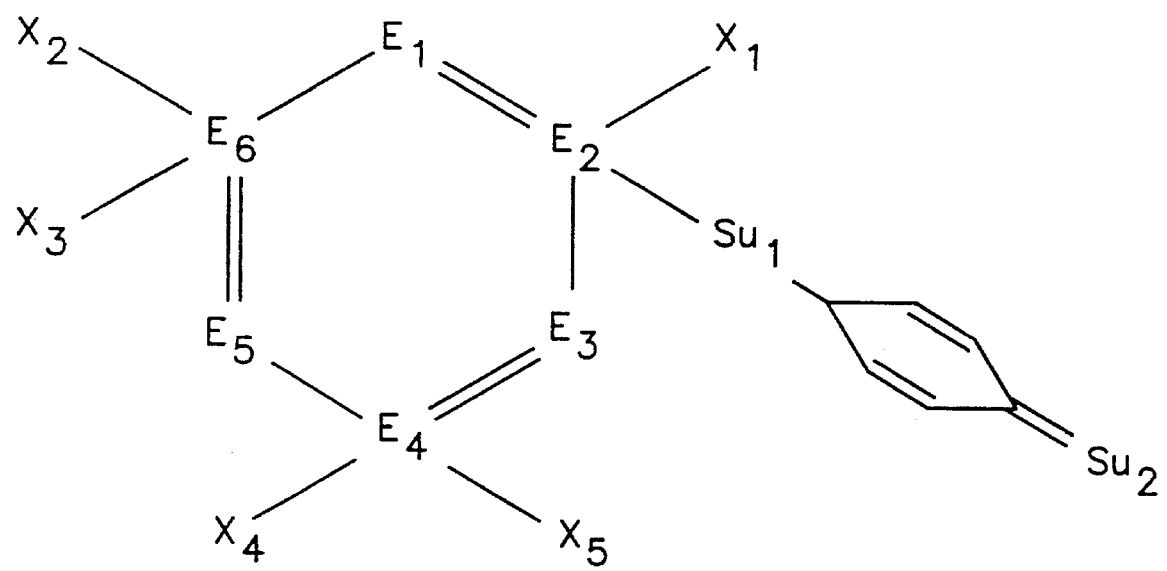
FIG. 1 is a chemical structure of a hexametric compound according to the present invention.
Figure 2:
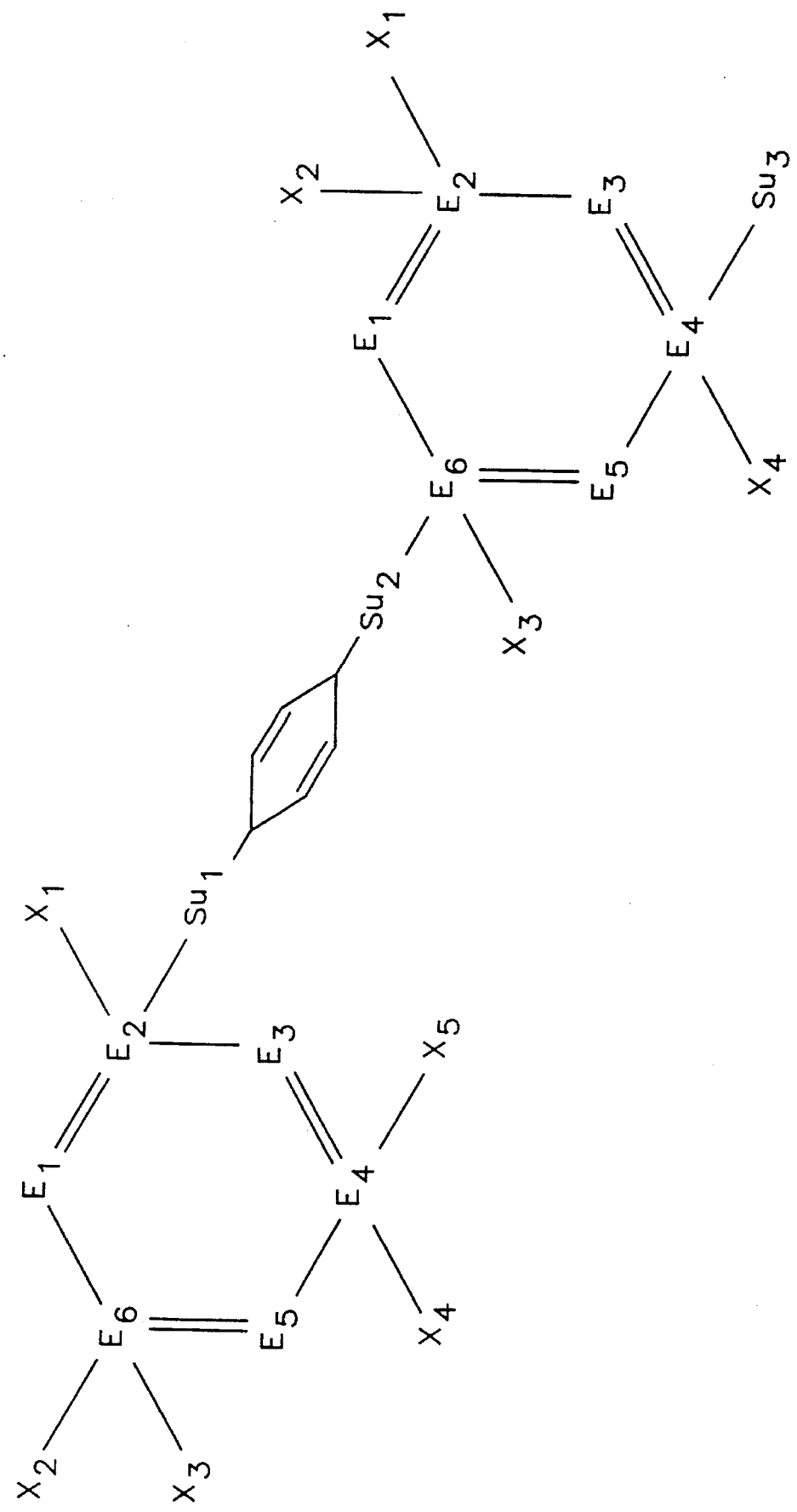
FIG. 2 is a chemical structure of the polymer according to the present invention.

A hexametric structure is shown in FIG. 1. Elements $E_1$ through $E_6$ are elements selected from group 3a, 4a, and 5a and 6a of the periodic table of elements. Because the compound containing elements $E_1$ through $E_6$ is heterocyclic, elements $E_1$ through $E_6$ are not all identical. It is preferred, but not necessary, that elements $E_1$, $E_3$, and $E_5$ be identical and that elements $E_2$, $E_4$, and $E_6$ be identical. Species $X_1$ through $X_5$ are halogens from group 7a of the periodic table of the elements, or groups, for example amines. Species $X_6$ is not shown, but formerly occupied the position of the $Su_1$ atom bonded to element E2. Preferably, species $X_1$ through $X_6$ are identical. Elements $Su_1$ and $Su_2$ represent radical ends of the substitution molecule. Most commonly they are oxygen, but can also be another radical end including but not limited to sulfur or nitrogen. Moreover, it is not necessary for $Su_1$ and $Su_2$ to be identical. In other words, the cyclic organic radical anion may be asymmetric. The $Su_1$ atom bonded to element $E_2$ replaced element $X_6$ in a nucleophilic substitution. Remaining elements $X_1$ to $X_5$ are available for additional nucleophilic substitution for bonding to the $Su_1$ on other molecules of the cyclic organic radical anion. In addition, the remaining $Su_2$. is available for nucleophilic substitution bonding to a halogen on another speciated inorganic heterocycle compound.

Compounds that are cyclic organic radical anions include quinones, preferably benzoquinone, and most preferably 1,4-benzoquinone. Additionally, quinones include naphthaquinone, anthraquinone, and quinones having attached conjugated rings of four or more. The cyclic organic radical anion includes at least two functional bonding sites, for example —O—, —OH, —CN, —CO, —NO, —$NH_2$, —$SO_3H$, and/or —SH. The functional bonding sites may be identical or different and are preferably located at selected position(s) on the cyclic organic radical anion. Specifically, when the cyclic organic radical anion is a benzoquinone type, then the functional bonding sites are preferably located on the 1, 4 (para) position(s) of the cyclic organic radical anion.

METHODS

A method of making an inorganic-organic polymer composite material according to the present invention includes the steps (a) preparing a substantially non-aqueous electrolytic medium having at least one cyclic organic radical anion compound;

(b) mixing at least one speciated inorganic heterocyclic compound molecule in the substantially non-aqueous electrolytic medium; and (c) performing at least two nucleophilic substitutions between either the cyclic organic radical anion compound or the speciated inorganic heterocyclic compound with at least a second molecule of either the speciated inorganic heterocyclic compound or the cyclic organic radical anion compound respectively; thereby (d) forming a polymer of an inorganic-organic composite.

The electrolytic medium is preferably a non-aqueous solution. Non-aqueous solvents include but are not limited to tetrahydrofuran, acetonitrile, nitrobenzene, propylene carbonate, dimethyl sulfoxide, alkyl ethers, and combinations thereof. The electrolytic medium further contains a conductive compound, or electrolyte, preferably a salt.

In a preferred embodiment of the present invention, the cyclic organic radical anion compound is generated electrochemically from a cyclic organic intermediate compound. The cyclic organic intermediate compound having at least two functional bonding sites is placed in the electrolytic medium then electrochemically reduced to the cyclic organic radical anion.

The presence of water in the substantially non-aqueous electrolytic medium permits protonation of the cyclic organic radical anion which limits or substantially prevents the cyclic organic radical anion from participating in the nucleophilic substitution reaction. Hence, it is necessary to limit the amount of water present in the substantially non-aqueous electrolytic medium. The tolerable amount of water depends upon the particular cyclic organic radical anion that is used. However, for most cyclic organic radical anions, the amount of water is preferably limited to an amount less than about 10 vol. percent, and more preferably less than about 5 vol. percent. Specifically, when benzoquinone is the cyclic organic radical anion, water permits protonation of benzoquinone $BQ^{2-}$ to and/or BQOH which is undesirable because the $BQ^{2-}$ and/or $BQOH^-$. cannot participate in the nucleophilic substitution reaction. It is therefore preferred to limit the amount of water present in benzoquinone to less than about 5 vol. percent, and more preferable to limit the amount of water to less than about 1 vol. percent.

The molar ratio of the cyclic organic compound to electrolyte in a non-aqueous solution may be from about 0.001 to about 10 but is preferably about 0.05 to about 0.5, and most preferably about 0.1. Within these mole ratios, the electropolymerization reaction is not reagent limited thereby permitting polymer films to be grown on a time scale of the order of minutes.

Also in a preferred embodiment of the present invention, the nucleophilic substitution that creates a bond between the cyclic organic radical anion and the speciated inorganic heterocyclic compound is performed at or near the cathode of an electrochemical cell. After generating the cyclic organic radical anion, a speciated inorganic heterocyclic compound is added to the electrolyte. Application of a potential difference between the electrodes generates a current flow that results in electrochemical reduction of the cyclic organic compound at the cathode and stimulation of the nucleophilic substitution. Alternatively, the nucleophilic substitution can be accomplished without the electrochemical current.

Stimulation of the nucleophilic substitution reaction with the cathodic reaction requires a potential step from the initial open cell potential to a final potential. The final potential will depend upon the cyclic organic compound and the electrolytic salt, but is expected to range from about −0.3 to about −4.5 Volt. Preferably, the final potential is from about −0.5 to about −2.5 Volt, to minimize any interfering electrochemical reactions in which the solvent or electrolyte may undergo. It is further an option to cycle the potential or maintain a constant current, or in other words to use either a galvanostatic or potentiostatic mode of operation. The selection of cell mode of operation affects the microstructure of the polymer product. The pore size and homogeneity of the composite material can be controlled by changing the deposition parameters (current, voltage, size of the organic precursor). Heterogeneity can be achieved by mixing a combination of organic precursors. Pore sizes range from nanometer to micrometer diameters.

It is preferred, but not necessary, to perform mixing and electrochemical operation in an inert atmosphere to preclude direct oxidation of the speciated inorganic heterocyclic ring. Acceptable atmospheres include but are not limited to inert atmospheres, oxidizing atmospheres and reducing atmospheres. A non-oxidizing atmosphere is preferred, more specifically nitrogen and/or noble gases having an oxygen content below about 10 millitorr, but preferably below about 1 millitorr.

EXAMPLE 1

A composition was made according to the present invention. A sample of the composition in the form of a polymer film was subjected to an elemental analysis performed by Schwarzkopf Microanalytical Laboratory in New York, N.Y. (data in Table 1). Infrared reflectance spectra were obtained using a Nicolet 660 data system. ATR (attenuated total reflectence) spectroscopic measurements were performed as well on a sample deposited onto thin Pt-glass substrates and placed in contact with the ZnSe crystal part of the ATR attachment. Further, Auger analysis was performed to confirm elemental composition and to evaluate changes in chemical bonding.

TABLE 1

| Sample Composition, Elemental Analysis | |
|---|---|
| Element | Composition, wt % |
| Phosphorus | 16.3 |
| Nitrogen | 7.9 |
| Carbon | 39.5 |
| Hydrogen | 4.0 |
| Chlorine | 11.3 |

The Auger analysis showed that the principal P and N electron lines are closer to those of [NP(OPh)$_2$]$_3$ than those of a linear phosphazene polymer.

The multiple-ATR FT-IR spectrum of the polymer sample showed P-N stretching vibrations at 1248 cm$^{-1}$ 1200 cm$^{-1}$, and 1150 cm$^{-1}$ which confirms the presence of a cyclochlortriphosphazene ring. According to H. R. Allcock, PHOSPHOROUS-NITROGEN COMPOUNDS, Academic Press, New York, London (1972), Chapter 3, pp 51–55, cyclophosphazenes exhibit IR bands near 1200–1400 cm$^{-1}$. Moreover, an absorption at 1686 cm$^{-1}$ was observed that is characteristic of the C=O double bond and an absorption at 1568 cm$^{-1}$ was observed characteristic of the C=C double bond in benzophenone. An additional vibrational mode at 962 cm$^{-1}$ was observed and is representative of the coupling of benzoquinone to the speciated inorganic heterocyclic compound.

Atomic Force Micrographs were obtained which confirmed the presence of a three-dimensional crosslinked structure.

EXAMPLE 2

An experiment was conducted according to the method of the present invention. A solution was made containing a solvent of anhydrous acetonitrile, CH$_3$CN (Aldrich), a speciated inorganic heterocyclic compound of reagent grade 0.01M hexachlorocyclotriphosphazene, (NPCl$_2$)$_3$, (Elf Atochem), a cyclic organic compound of reagent grade 0.01M 1,4-benzoquinone (BQ) (Aldrich), and an electrolyte of reagent grade 0.1M Bu$_4$NBF$_4$ (Aldrich). The Bu$_4$NBF$_4$ was first recrystallized from HPLC grade methanol (Aldrich) and deionized water and dried overnight in an oven at about 70° C. to remove residual water prior to its use as an electrolyte in solution.

The reference electrode was silver/silver$^+$ (Ag/Ag$^+$) and the cathode was platinum or gold. An atmosphere of nitrogen was maintained to avoid oxidation of the benzoquinone reduced anion.

Polymer films were successfully grown on the cathode either by cycling the electrical potential between 0 and −1.2 Volts for 30 minutes or by applying a constant potential at −1.0 Volt for 10 minutes.

One film was grown under an atmosphere of nitrogen and another film was grown under an atmosphere of air. Table 2 shows the composition of the films produced. Both films were subjected to infrared NMR and XPS analyses. It was found that there was no difference in composition between the film made in air and the film made in nitrogen.

TABLE 2

| | Film Composition | |
|---|---|---|
| Element | In Air | In Nitrogen |
| Phosphorus | 19.3 | 16.3 |
| Nitrogen | 10 | 7.9 |
| Carbon | 33.4 | 39.5 |
| Hydrogen | 3.4 | 4.0 |
| Chlorine | 10.0 | 11.3 |
| Chlorine | 15.5 | NA |
| Iodine | <0.5 | NA |

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of making an inorganic-organic polymer composite material, comprising the steps of:

(a) preparing a substantially non-aqueous medium having less than about 10 volume percent water and further having at least one cyclic organic radical anion with at least one speciated inorganic heterocyclic compound in the substantially non-aqueous electrolytic medium; and (b) performing a nucleophilic substitution reaction between the cyclic organic radical anion and the speciated inorganic heterocyclic compound and (c) forming the inorganic-organic polymer composite.

2. The method as recited in claim 1, further comprising the step of:

generating the cyclic organic radical anion cathodically.

3. The method as recited in claim 1, wherein the nucleophilic substitution is performed at or near a cathode of an electrochemical cell.

4. A method for making an inorganic-organic composite material, comprising the steps of:

(a) electrochemically generating a reactive cyclic organic compound from a cyclic organic intermediate compound in an electrolytic mixture of an inorganic solvent and an electrolyte;

(b) adding a speciated inorganic heterocyclic compound and forming a reactive mixture; wherein (c) an electrochemical nucleophilic substitution occurring at cathode bonds the reactive cyclic organic compound with the speciated heterocyclic compound and forms a film of the inorganic-organic composite material on the cathode.

5. The method as recited in claim 4, wherein the electrochemical generation is done under an atmosphere of air.

6. The method as recited in claim 4, wherein the cyclic organic intermediate compound is a quinone.

7. The method as recited in claim 4, wherein the electrochemical generation uses a variable current.

8. The method as recited in claim 4, wherein the speciated inorganic heterocyclic compound is selected from the group consisting of multi-metric ring compounds.

9. The method as recited in claim 4, wherein the reactive mixture has less than about 10 volume percent water.

10. An inorganic-organic composite polymer material, comprising:

at least two molecules of a speciated inorganic heterocyclic compound bonded to at least one molecule of a cyclic organic radical anion compound wherein the bonding between said first and second compounds is by nucleophilic substitution.

11. The material as recited in claim 10, wherein the speciated inorganic heterocyclic compound is selected from the group consisting of multi-metric ring compounds.

12. The material as recited in claim 11, wherein the multi-metric ring compound is selected from the group of trimetric, tetrametric, hexametric, and octametric ring compounds.

13. The material as recited in claim 11, wherein the multi-metric ring further includes a functional bonding site.

14. The material as recited in claim 13, wherein the functional bonding site is selected from the group consisting of —P—X, —B—X, and/or —S—X, or Si—X, Se—X, or Ge—X bonds, and a combination of bonds thereof wherein X is a halogen from group 7a of the periodic table of the elements.

15. The material as recited in claim 11, wherein the multi-metric ring is a cyclic phosphazene.

16. The material as recited in claim 15, wherein the cyclic phosphazene is selected from the group consisting of cyclometallophosphazene, and chlorocyclophosphazene compounds.

17. The material as recited in claim 10, wherein the cyclic organic radical ion is a quinone.

18. The material as recited in claim 31, wherein the quinone is a benzoquinone, and the material is a film.

19. A method for making an inorganic-organic polymer, comprising the steps of:

(a) electrochemically generating a reactive cyclic organic anion from a difunctional cyclic organic compound in an electrolytic mixture of an electrolytic salt and a speciated inorganic heterocyclic precursor therein; wherein (c) an electrochemical nucleophilic substitution occurring at the cathode bonds the reactive cyclic organic anion with at least two molecules of the speciated heterocyclic precursor and forms the inorganic-organic polymer.

20. The method as recited in claim 19, wherein said difunctional cyclic organic compound is a quinone.

21. The method as recited in claim 19, wherein said speciated inorganic heterocyclic precursor is a phosphazene.

22. A method of making an inorganic-organic polymer composite material, comprising the steps of:

(a) preparing a substantially non-aqueous electrolytic medium having at least one cyclic organic radical anion with at least two speciated inorganic heterocyclic compound molecules in the substantially non-aqueous electrolytic medium; and (b) performing a nucleophilic substitution reaction between the cyclic organic radical anion and the speciated inorganic heterocyclic compound molecules; and (c) forming the inorganic-organic polymer composite wherein two of said at least two speciated inorganic heterocyclic compound molecules are attached to one of said at least one cyclic organic radical anion.

23. The method as recited in claim 22, wherein said cyclic organic anion is a quinone.

24. The method as recited in claim 22, wherein said speciated inorganic heterocyclic compound molecules are a phosphazene.

* * * * *

UNITED STATES PATENT AND TRADEMARK OFFICE
CERTIFICATE OF CORRECTION

PATENT NO. : 5,569,736
DATED : October 29, 1996
INVENTOR(S) : Josowicz et al.

It is certified that error appears in the above-indentified patent and that said Letters Patent is hereby corrected as shown below:

In column 4, line 32 after the words "quinone $BQ^{2-}$", please delete the word --to--.

In column 4, line 32 after the word "quinone", please insert the word --to--

In column 4, line 32 please replace "BQOH" with --$BQOH^-$--.

Signed and Sealed this

Nineteenth Day of August, 1997

Attest:

BRUCE LEHMAN

Attesting Officer

Commissioner of Patents and Trademarks